US012676737B2

(12) United States Patent
Kawaguchi

(10) Patent No.: US 12,676,737 B2
(45) Date of Patent: Jul. 7, 2026

(54) SERVICE PROVISION SYSTEM

(71) Applicant: Nomura Research Institute, Ltd.,
Tokyo (JP)

(72) Inventor: Masashi Kawaguchi, Tokyo (JP)

(73) Assignee: Nomura Research Institute, Ltd.,
Tokyo (JP)

( * ) Notice: Subject to any disclaimer, the term of this
patent is extended or adjusted under 35
U.S.C. 154(b) by 168 days.

(21) Appl. No.: 18/039,011

(22) PCT Filed: Dec. 11, 2020

(86) PCT No.: PCT/JP2020/046433
§ 371 (c)(1),
(2) Date: May 26, 2023

(87) PCT Pub. No.: WO2022/123795
PCT Pub. Date: Jun. 16, 2022

(65) Prior Publication Data
US 2023/0370252 A1     Nov. 16, 2023

(51) Int. Cl.
*H04L 9/08*          (2006.01)
(52) U.S. Cl.
CPC .................................... *H04L 9/085* (2013.01)
(58) Field of Classification Search
CPC ..... H04L 9/085; H04L 220/42; H04L 9/3213;
G09C 1/00
See application file for complete search history.

(56) References Cited

U.S. PATENT DOCUMENTS

| | | | | |
|---|---|---|---|---|
| 6,959,394 B1* | 10/2005 | Brickell | ............. | G06Q 20/3829 |
| | | | | 726/19 |
| 10,380,380 B1* | 8/2019 | Abdi Taghi Abad | ........................ | |
| | | | | G06F 21/6245 |
| 2013/0073388 A1* | 3/2013 | Heath | .................... | G06Q 50/01 |
| | | | | 705/14.53 |
| 2014/0089196 A1* | 3/2014 | Paya | .................. | G06Q 20/3827 |
| | | | | 705/44 |
| 2014/0379521 A1* | 12/2014 | Novotny | ................ | G06N 20/00 |
| | | | | 706/14 |
| 2019/0342096 A1* | 11/2019 | Starosielsky | ....... | H04L 63/0428 |

(Continued)

FOREIGN PATENT DOCUMENTS

| | | |
|---|---|---|
| JP | 5727353 B | 6/2015 |
| JP | 2015-532737 A | 11/2015 |

*Primary Examiner* — Phy Anh T Vu
(74) *Attorney, Agent, or Firm* — RANKIN, HILL &
CLARK LLP

(57) ABSTRACT

A client includes: a share provision unit acquiring VC from
a VC storage unit, dividing the VC into a plurality of shares
by a secret sharing method, and distributing each share to a
server; and a group synchronization unit acquiring informa-
tion of a group ID related to the VC returned from the server,
storing the information in an ID storage unit, and decrypting
and acquiring a predetermined secret calculation result
related to a service in the server on the basis of the group ID.
The server includes: a share acquisition unit acquiring the
share distributed from the client; a verification processing
unit grouping the VCs having the same value of the ID
information included in the VCs related to the share, issuing
a group ID, and storing the grouped information in a share
storage unit; and a group synchronization unit returning the
information including the group ID to the client.

5 Claims, 9 Drawing Sheets

(56)         References Cited

U.S. PATENT DOCUMENTS

| | | | |
|---|---|---|---|
| 2020/0186349 A1 * | 6/2020 | Thubert | G06F 16/9024 |
| 2021/0090126 A1 * | 3/2021 | Schobeiri | G06Q 30/0269 |
| 2021/0119801 A1 * | 4/2021 | Kim | H04L 63/123 |
| 2022/0005072 A1 * | 1/2022 | Chhipa | G06Q 30/0255 |

* cited by examiner

Figure 5:
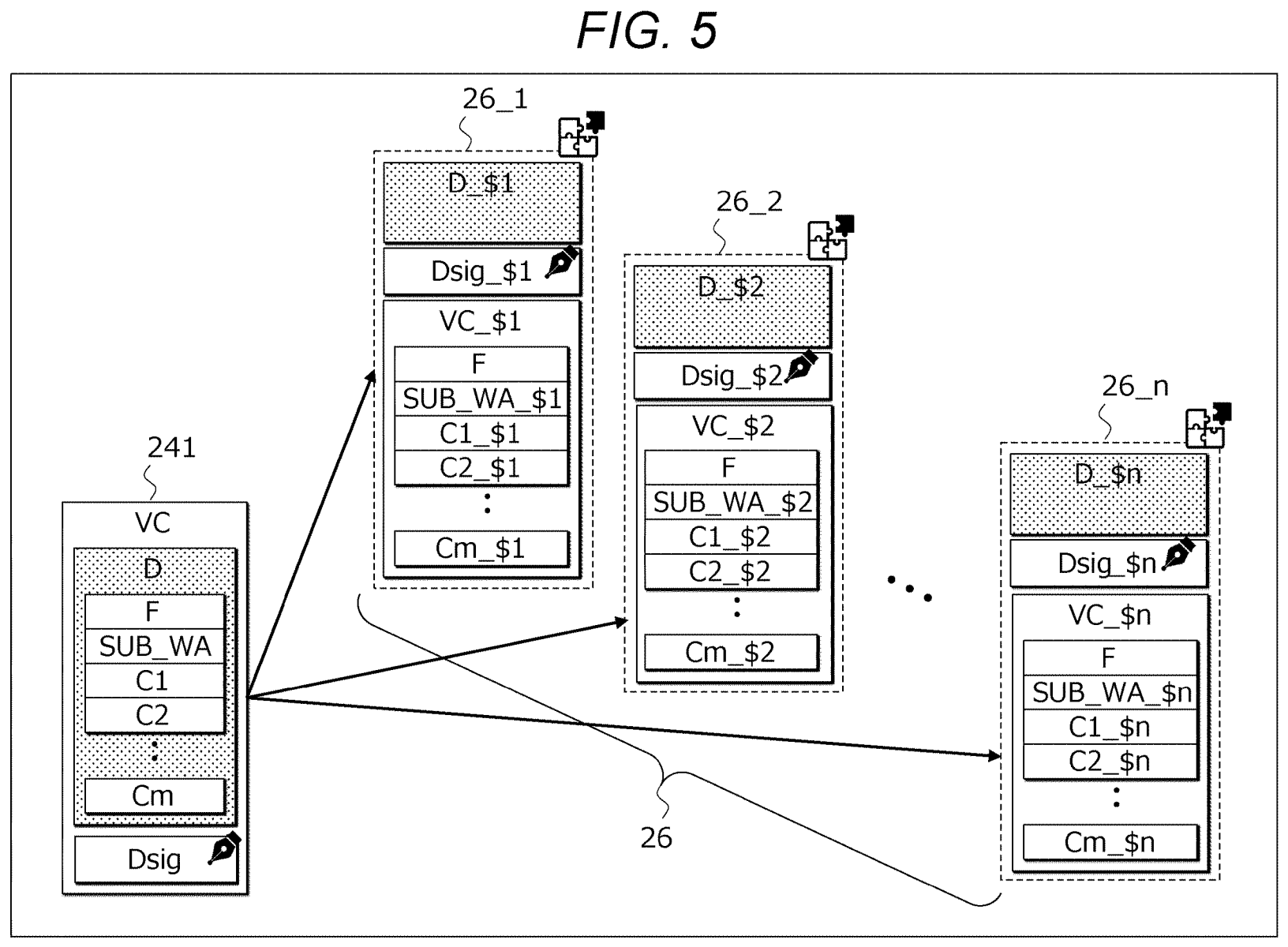

Dsig_$n

VC_$n

F

SUB_WA_$n

C1_$n

C2_$n

· ·

Cm_$n

26_2

D_$2

Dsig_$2

VC_$2

F

SUB_WA_$2

C1_$2

C2_$2

· ·

Cm_$2

26

26_1

D_$1

Dsig_$1

VC_$1

F

SUB_WA_$1

C1_$1

C2_$1

· ·

Cm_$1

241

VC

D

F

SUB_WA

C1

C2

· ·

Cm

Dsig

| VCID | D | Dsig | F | SUB_WA |
|------|---|------|---|--------|
| VC001 | `{`<br>`"alg": "RS256",`<br>`"typ": "JWT",`<br>`"kid": "did:example:123...#keys-1"`<br>`},`<br>`{`<br>`"sub": "did:example:456...",`<br>`...`<br>`"vc": {`<br>`"@context": [`<br>`"https://www.w3.org/2018/credentials/v1",`<br>`"https://www.w3.org/2018/credentials/examples/v1"`<br>`],`<br>`"type": ["VerifiableCredential",`<br>`"UniversityDegreeCredential"],`<br>`"credentialSubject": {`<br>`"name": "Alice Carroll",`<br>`"major": "Engineering",`<br>`...` | BgwE97... | `{`<br>`"alg": "RS256",`<br>`"typ": "JWT",`<br>`"kid": "did:example:123...#keys-1"`<br>`},`<br>`{`<br>`"sub": ${SUB_WA}`<br>`...`<br>`"vc": {`<br>`"@context": [`<br>`"https://www.w3.org/2018/credentials/v1",`<br>`"https://www.w3.org/2018/credentials/examples/v1"`<br>`],`<br>`"type": ["VerifiableCredential",`<br>`"UniversityDegreeCredential"],`<br>`"credentialSubject": {`<br>`"name": ${C001}`<br>`"major": "Engineering"`<br>`...` | did:examp<br>le:123...#<br>keys-1 |
| VC002 | ... | ... | ... | ... |
| ... | | | | |

| VCID | CLAIM ID | KEY | DATA TYPE | VALUE |
|---|---|---|---|---|
| VC001 | C001 | name | string | Alice Carroll |
| VC001 | C002 | major | string | Engineering |
| ... | ... | ... | ... | ... |

| LENDING GROUP ID | LENDING CLAIM ID | KEY | DATA TYPE | VALUE |
|---|---|---|---|---|
| GROUP 1 | LC001 | name | string | Alice Carroll |
| GROUP 1 | LC002 | major | string | Engineering |
| ... | | ... | ... | ... |

| LENDING GROUP ID | SUB_WA |
|---|---|
| GROUP 1 | 30181B... |
| ... | ... |

| LENDING GROUP ID | LENDING CLAIM ID | PLAINTEXT FLAG | KEY | DATA TYPE | VALUE |
|---|---|---|---|---|---|
| GROUP 1 | C001 | False | name | string | 633A48... |
| GROUP 1 | C002 | True | major | string | Engineering |
| ... | ... | ... | ... | ... | ... |

SERVICE PROVISION SYSTEM

BACKGROUND

Technical Field

The present invention relates to a technology for providing personalized services, and particularly relates to a technology effective when applied to a service provision system that provides a personalized service without identifying a user himself/herself.

Background Art

With the progress of IT technology, there is an increasing need to provide/receive personalized services not only on the Web but also in every situation. In order for the user to receive provision of a personalized service, as a premise, it is necessary to provide a service provider with information that leads to identification of a person himself/herself and disclosure of privacy, including personal information such as a profile of the person himself/herself, information regarding preferences such as tastes, likings, and interests, and information regarding action histories such as a browsing history and a purchasing history. The user agrees in advance that the service provider acquires and uses these pieces of information regardless of whether explicitly or implicitly, and then receives the provision of the personalized service. However, there is a risk that the information is leaked in the service provider or is illegally used by a malicious person.

To manage the risk, a mechanism for providing a personalized service while protecting the privacy of the user has also been studied. For example, JP 2015-532737 A (Patent Literature 1) describes a mechanism that provides true protection for private information of an end user by providing anonymity to the private information of each end user without restricting use of an application on the one hand, and receives a personalized service by using an arbitrary computer device or enables use of other applications or services that require user clustering according to similarity of private data on the other hand.

CITATION LIST

Patent Literature

Patent Literature 1: JP 2015-532737 A

Technical Problem

According to the existing technology, for example, as in a case of providing an advertisement or the like specialized for a user clustered on the basis of likings, interests, or the like, it is possible to provide a personalized service while protecting privacy of the user for a service whose strictness is not required from the viewpoint of whether the service may be provided to the user.

However, for example, it is not considered to provide a service allowed to be provided only to a target user himself/herself in a personalized manner while protecting privacy without specifying the user. In addition, it is also not considered to check that data to be provided to a service provider for the user to receive provision of a personalized service is proper data belonging to the user.

Therefore, an object of the present invention is to implement a service provision system that provides a personalized service including a service unique to a user while protecting privacy without requiring identification of the user himself/herself.

The above-described and other objects and novel features of the present invention will be clarified by the description herein and the attached drawings.

SUMMARY

The outline of a representative one of the inventions disclosed in the present application will be briefly described as follows.

A service provision system as a representative embodiment of the present invention is a service provision system that provides a service to a first device of a user via a network by one or more second devices, and has the following configuration.

That is, the first device includes a share provision unit that acquires a VC from a VC storage unit that stores data VC verifiable as being of the user, divides the VC into a plurality of shares by a secret sharing method, and distributes each of the shares to the second device, and a first group synchronization unit that acquires information of a group ID related to one or more of the VCs returned from the second device, stores the information in an ID storage unit, and decrypts (reconstructs) and acquires a predetermined secret calculation result related to the service in the second device by the secret sharing method on the basis of the group ID.

In addition, the second device includes a share acquisition unit that acquires the share distributed from the first device, a verification processing unit that groups the VCs having the same value of ID information included in the VCs related to the share, issues the group ID, and stores the group ID and information related to the share in a share storage unit, and a second group synchronization unit that returns information including the group ID to the first device.

Advantageous Effects of Invention

Advantageous effects of the invention disclosed in the present application that are achieved by a representative embodiment will be briefly described as follows.

That is, according to the representative embodiment of the present invention, it is possible to provide a personalized service including a service unique to a user while protecting privacy without requiring identification of the user himself/herself.

BRIEF DESCRIPTION OF DRAWINGS

FIG. 5 is a diagram illustrating an outline of an example of application of a secret sharing method according to an embodiment of the present invention.

FIG. 6 is a table illustrating an outline of a data configuration of a VC storage unit and specific data example according to an embodiment of the present invention.

FIG. 7 is a table illustrating an outline of a data configuration of a VC storage unit and specific data example according to an embodiment of the present invention.

FIG. 8 is a table illustrating an outline of a data configuration of an ID storage unit and specific data example according to an embodiment of the present invention.

FIG. 9 is a table illustrating an outline of a data configuration of a share storage unit and specific data example according to an embodiment of the present invention.

FIG. 10 is a table illustrating an outline of a data configuration of a share storage unit and specific data example according to an embodiment of the present invention.

DETAILED DESCRIPTION

Figure 1:
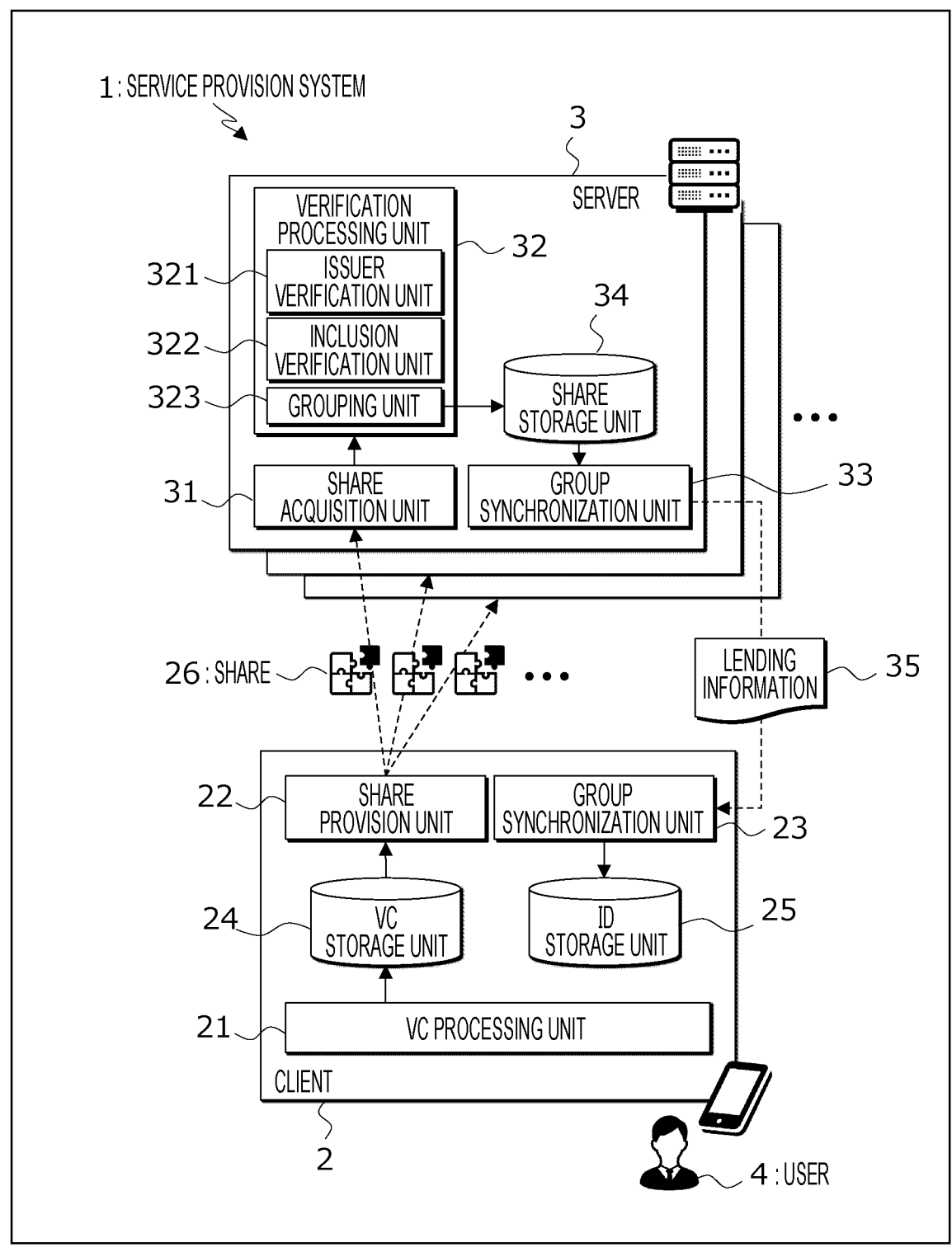
FIG. 1 is a diagram illustrating an outline of a configuration example of a service provision system according to an embodiment of the present invention.

Embodiments of the present invention will be described below in detail with reference to the drawings. In all the drawings for describing the embodiments, identical parts are in principle given identical reference numerals, and duplicated description thereof will be omitted. Meanwhile, a component described with a reference numeral with reference to one drawing may be mentioned again with the same reference numeral in the description with reference to other drawings in which the component is not illustrated.

Outline

A service provision system according to an embodiment of the present invention implements a mechanism in which a service user provides a service provider with data related to the service user, and the service provider provides a personalized service on the basis of the data. In the present embodiment, the data provided by the user at that time is data verifiable as being of the user himself/herself (verifiable credentials, which may be hereinafter described as "VC"). As a result, it is possible to restrict provision of a unique service allowed to be provided to the user. In addition, privacy protection for the user is implemented by causing the service provider to be unable to identify the user himself/herself from the provided data (by causing identification of the user himself/herself unnecessary).

As a mechanism for protecting privacy so that the service provider cannot identify the user himself/herself on the basis of the data provided by the user, a so-called secret calculation technology is used in the present embodiment. The secret calculation is a technology of calculating data to be calculated in a ciphered state to obtain a calculation result, and enables the data to be calculated and calculation processes to be concealed.

In the present embodiment, multi-party computation (hereinafter sometimes referred to as "MPC") is used as a secret calculation method. That is, the data of the user is divided into a plurality of shares by the secret sharing method and arranged in different servers in an isolated state, and the server side performs calculation such as addition and multiplication while maintaining secrecy of the data while performing communication between the servers to obtain a calculation result.

The MPC including functional completeness can calculate an arbitrary function or algorithm while keeping data secret. Since this calculation result is also in a secret-shared state, only a person who is allowed to collect each share, that is, only the user himself/herself who has provided the data can perform decryption (reconstruction) unless parties participating in the MPC provide shares to each other or to an outside to permit decryption (reconstruction), and the server side cannot look into the provided data or the calculation result. Since the secret state can be maintained unless the calculation result is decrypted (reconstructed) by an unintended party, so-called output privacy can be prevented from causing a problem.

As a result, the service provider can provide the calculation result (or the service personalized on the basis of the calculation result) to the user himself/herself without identifying the user himself/herself as well as knowing content of the data provided by the user. Note that, as the secret sharing method, for example, an additive secret sharing method with a threshold (k, n) (n≥k≥2) can be used.

Meanwhile, to treat the data provided by the user as a verifiable VC, information indicating an identity (ID) is associated with each data. As a management base of the ID, a so-called centralized ID can be used, but in the present embodiment, a decentralized identity (ID) (may be described as "DID" below) mechanism using blockchain and distributed ledger technology is used. Standardization of the DID specification is currently in progress. Each data is associated with a wallet address (Hereinafter may be referred to as "WA". Note that meta information that makes a network, a protocol, or the like unique, which provides the DID, may be assigned to the wallet address) in the blockchain as ID information of the user himself/herself.

Note that the format of the data handled with the DID is all formats that can be adopted by the VC (for definition of a data model, see the W3C recommendation below. https://www.w3.org/TR/vc-data-model/#:~:text=Data%20derived%20from%20one%20or, a%20process%20of%20cryptographic%20verification.), and may be any data type that can be expressed by an array or an associative array (map format). For example, JavaScript Object Notation (JSON), YAML, Concise Binary Object Representation (CBOR), TOML, or the like can be used. In the present embodiment, description will be made assuming that JSON (JSON-LD) is used unless otherwise specified.

By using the DID mechanism, it is possible to perform identity verification of an arbitrary partner with the intention of the user himself/herself. In the present embodiment, the DID mechanism is used not only for identity verification but also as a means of expressing an intention to give permission for data collection and utilization to an arbitrary partner on the basis of the intention of the user himself/herself.

Note that, in the present embodiment, the DID is used as an example of a method for implementing a mode in which data is treated as VC. Therefore, the data to which a signature is added is expressed as "VC" in accordance with the term of DID. However, the means for reproducing the present embodiment is not limited to the means using the DID, and thus can be used in a data format different from the VC defined in the specification of the DID. Data corresponding to the VC in the DID can be appropriately used as long as the data satisfies all of following conditions.

1. There is an issuer responsible for issuing the data, and a digital signature is added as a means for proving that the data is issued by the issuer.

2. The data includes information (for example, WA, my number, passport number, and the like) indicating an identity (ID).

3. The issued data is structured data such as an array, an associative array, JSON, YAML, or TOML, or a set of the structured data, and the data is restorable when meta information such as an array number or an attribute assigned to each element is given even if a format and elements are separated.

4. A storage location of the identity (ID) information can be uniquely determined in structured data.

5. The data includes information that uniquely determines a digital signature algorithm and a public key acquisition method.

6. The digital signature has been performed for the structured data or the entire set of structured data at a time.

As an example satisfying the above condition 3, for example, when correspondence between the array number and the element is unique, such as (0, a), (1, b), and (2, c) for data [a, b, c], original data [a, b, c] is restorable from the information. Similarly, for example, data {"name":"alice", "age":42} is restorable from ("name", "alice") and ("age", 42). The same similarly applies to nested data such as [[a, b, c], [d, e], [f]], and the original data is restorable as long as the correspondence (mapping) between the array number (an upper array and a lower array) and the element can be made unique, such as (0, 0, a), (0, 1, b), (0, 2, c), (1, 0, d), (1, 1, e), and (2, 0, f).

As an example satisfying the above condition 4, for example, when there is a rule (or the rule is provided) that "the zeroth element is the identity" in the case of array or "a value of a sub attribute is the identity (particularly WA)" in the case of DID, the storage location of the ID information can be uniquely specified.

As a method satisfying the above condition 6, when a set of the structured data is $\{x_1, x_2, \ldots, x_j\}$ (j is the number of elements), a signature σ needs to be obtained by a signature algorithm Sign using a secret key sk and $(x_1 \| x_2 \| \ldots \| x_j))$ obtained by concatenating the set of structured data as input values.

$$\sigma = Sign(sk, (x_1 \| x_2 \| \ldots \| x_j))$$

Note that value and structure used for the concatenating portion (∥) of $(x_1 \| x_2 \| \ldots \| x_j)$ are arbitrary.

As a result, a result of a verification algorithm Verify (pk, σ, $(x_1 \| x_2 \| \ldots \| x_j))$ using the signature σ, the public key pk, and $\{x_1, x_2, \ldots, x_j\}$ as input values is required to return Accept. Taking JSON Web Signature (JWS) as an example, the set of structured data includes a header portion (Header) and a payload portion (Payload), and a signature portion (Signature) is obtained using a value obtained by concatenating the header portion and the payload portion with dots (.) as the input value.

Figure 2:
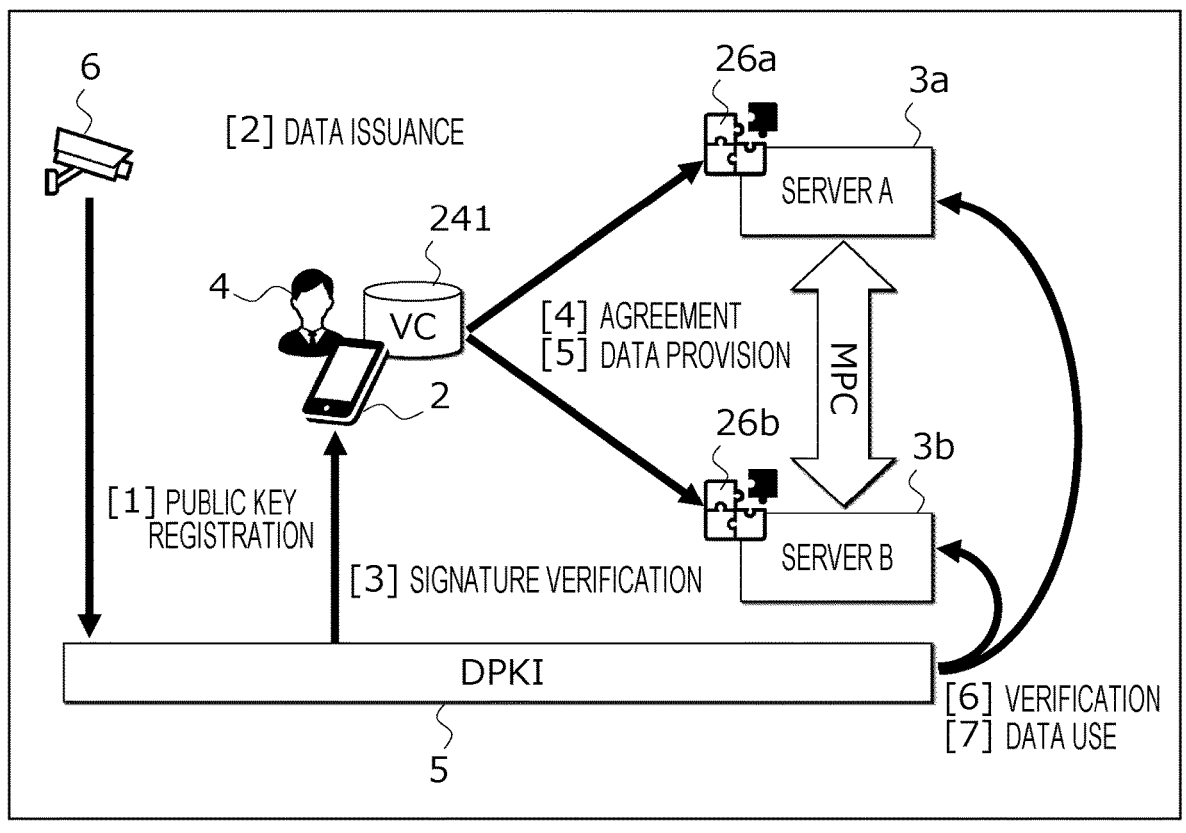
FIG. 2 is a diagram describing an outline of an example of a mechanism in an embodiment of the present invention.

FIG. 2 is a diagram describing an outline of an example of a mechanism in an embodiment of the present invention. A client 2 of a user 4 includes VC 241. The VC 241 includes, for example, data acquired by a data collection facility 6 such as a video camera in town (in this case, the data is a camera image but data collected by different facilities/services such as a purchase history of a payment service may also be applicable), and is issued ([2] in the drawing) with a digital signature by a secret key paired with a public key registered ([1] in the drawing) in a public key infrastructure (PKI) or a decentralized public key infrastructure (DPKI) 5. As described above, the VC 241 is represented by JSON in the present embodiment, and includes the WA with the DID as the ID information. The client 2 of the user 4 authenticates the issuer (data collection facility 6) by verifying the digital signature of the VC 241 with the public key registered in the DPKI 5 ([3] in the drawing).

In the present embodiment, the user 4 agrees to provide the VC 241 to the service provider ([4] in the drawing), and the client 2 of the user 4 provides a share 26a and a share 26b obtained by secret-sharing the VC 241 to a server A (3a) and a server B (3b) that participate in the MPC ([5] in the drawing). In the example of FIG. 2, the VC 241 is secret-shared to two shares and provided to two servers but may be secret-shared to two or more shares, that is, secret sharing based on a (k, n) threshold secret sharing method (n≥k≥2) may be performed and respective shares may be provided to different servers.

In the service provider, verification ([6] in the drawing) is performed through the MPC by the server A (3a) and the server B (3b), using the share 26a and the share 26b (ciphertext) and the public key (plaintext) registered in the DPKI 5 as input values. Also at the time of use ([7] in the drawing), the calculation result is obtained without obtaining the content of the original VC 241 by performing the MPC in the server A (3a) and the server B (3b), and the service personalized on the basis of the calculation result is provided.

Meanwhile, even if the service provider side cannot know the content of the original VC 241 and the calculation result, it cannot be said that privacy is completely protected in a case where the service provider side can know which user 4 the data is of, that is, in a case where the user 4 can be identified. Therefore, in the present embodiment, regarding one or more VCs 241 provided to the service provider side, (1) the content having not been tampered with and (2) all the VCs 241 being associated with the same user 4 are confirmed with the content being ciphered, then the VCs 241 provided to the service provider side are grouped, a group ID is assigned, and the group ID is returned to the user 4. As a result, the user 4 can request the personalized service on the basis of the returned group ID and receive the provision of the personalized service while keeping the service provider side from which user 4 the data is of.

Note that, in MPC processing on the service provider side, it is also possible to entrust calculation to an external trusted environment and have the calculation result returned to the server A (3a) and the server B (3b) in a secret-shared state, or to pass the group ID to an entrusted party and ask the entrusted party to distribute the calculation result. For example, the calculation is performed by means other than the MPC by allowing a trusted application (TA) in a TEE to perform decryption (reconstruction) instead of performing the calculation by the MPC, and the calculation result is secret-shared to the server A (3a) and the server B (3b) (at the same time, all pieces of information deposited in the entrusted party may be deleted from the environment of the entrusted party). This enables trade-off between safety and performance.

Figure 3:
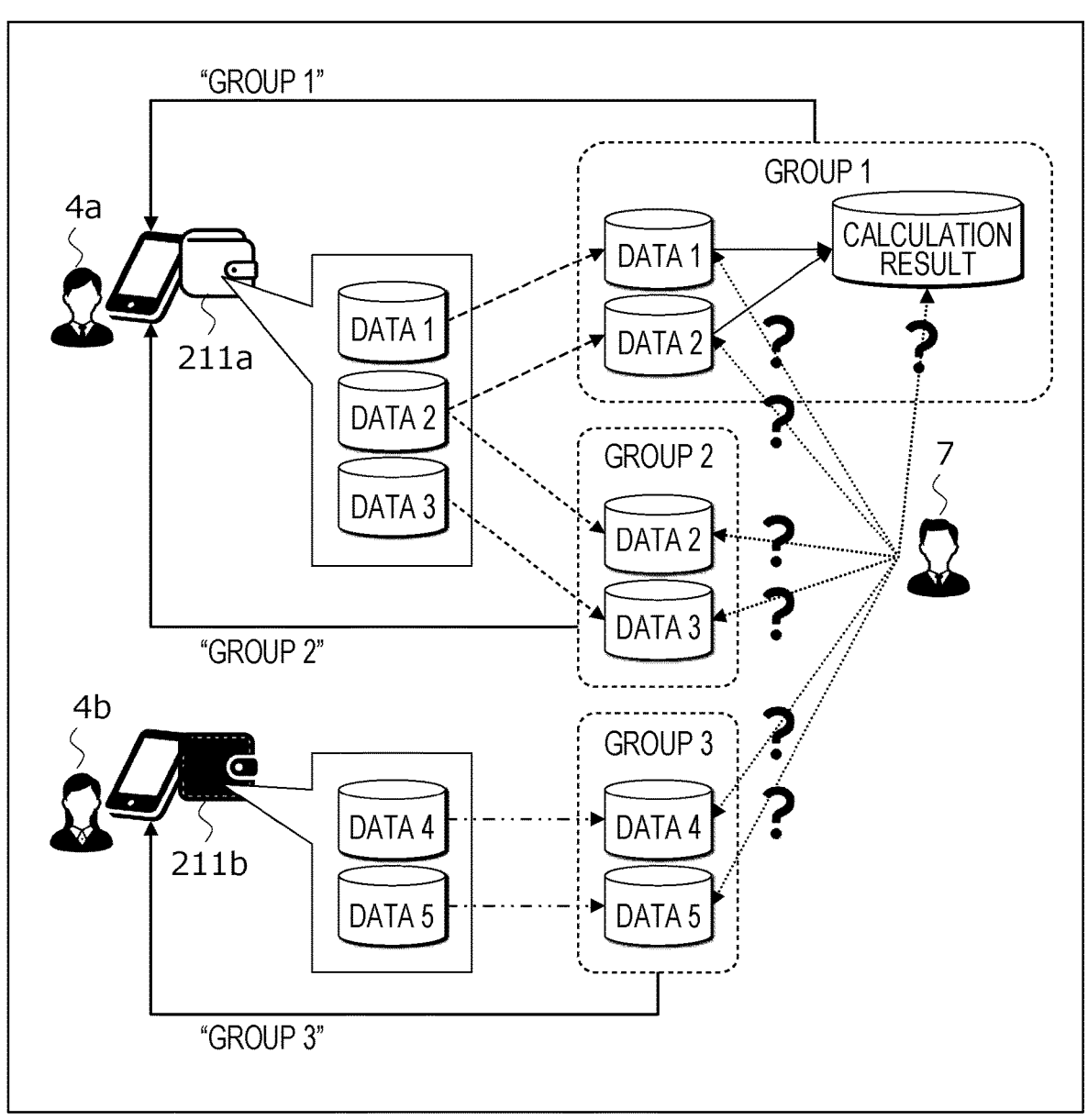
FIG. 3 is a diagram illustrating an outline of an example of a mechanism for providing a personalized service according to an embodiment of the present invention.

FIG. 3 is a diagram illustrating an outline of an example of a mechanism for providing a personalized service according to an embodiment of the present invention. The example in the drawing illustrates a state in which the VCs of "data 1", "data 2", and "data 3" are stored in a wallet 211a of a user 4a, and the VCs of "data 4" and "data 5" are stored in a wallet 211b of a user 4b.

The example indicates that the user 4a provides "data 1" and "data 2" to receive a certain service, whereas the service provider (server) issues a group ID of "group 1" to group these pieces of data. Similarly, the example indicates that the user 4a provides "data 2" and "data 3" to receive another service, whereas the service provider (server) issues a group ID of "group 2" to group these pieces of data. The issued group IDs of "group 1" and "group 2" are returned to the user 4a who is the provider of the target data. Similarly, the example indicates that the user 4b provides "data 4" and "data 5", whereas the service provider (server) issues a group ID of "group 3" to group these pieces of data. The group ID of "group 3" is returned to the user 4b.

In this case, for example, even if an administrator 7 (who has access rights to a database for the number of environments that is less than the threshold k required for the decryption of the secret sharing method) for the data on the service provider side refers to the content of the database, the administrator cannot grasp the content because all the data is ciphered (by secret sharing). Furthermore, the service provider side cannot grasp that any of the data is associated with the WA of the wallet 211a or the wallet 211b of each person, let alone the user 4a or the user 4b. That is, it is possible to implement identification impossibility that the administrator 7 (service provider) cannot identify the person who has provided the data.

Meanwhile, the administrator 7 can grasp that, for example, "data 1" and "data 2" included in "group 1" are associated with "same someone". That is, it is possible to personalize the service for "someone" of "group 1". The user 4a who the group ID of "group 1" has been returned can use the group ID to request the service personalized on the basis of the data of "group 1". That is, as for the calculation result based on "data 1" and "data 2" of "group 1", the group ID of "group 1" is associated with the calculation result on the service provider (server) side, so that the user 4a can make a request using the group ID of "group 1".

Similarly, since the administrator 7 can grasp that "data 2" and "data 3" of "group 2" are associated with the "same someone", it is possible to personalize the service for the "someone" of "group 2". The user 4a who the group ID of "group 1" and "group 2" has been returned can individually receive provision of the service based on "group 1" and the service based on "group 2". Note that the administrator 7 cannot grasp that "group 1" and "group 2" are associated with the "same someone". That is, "data 1" and "data 3" associated with the same user 4a cannot be aggregated by name. The same similarly applies to "group 3", since the administrator 7 can grasp that "data 4" and "data 5" are associated with the "same someone", it is possible to personalize the service for the "someone" of "group 3".

Figure 4:
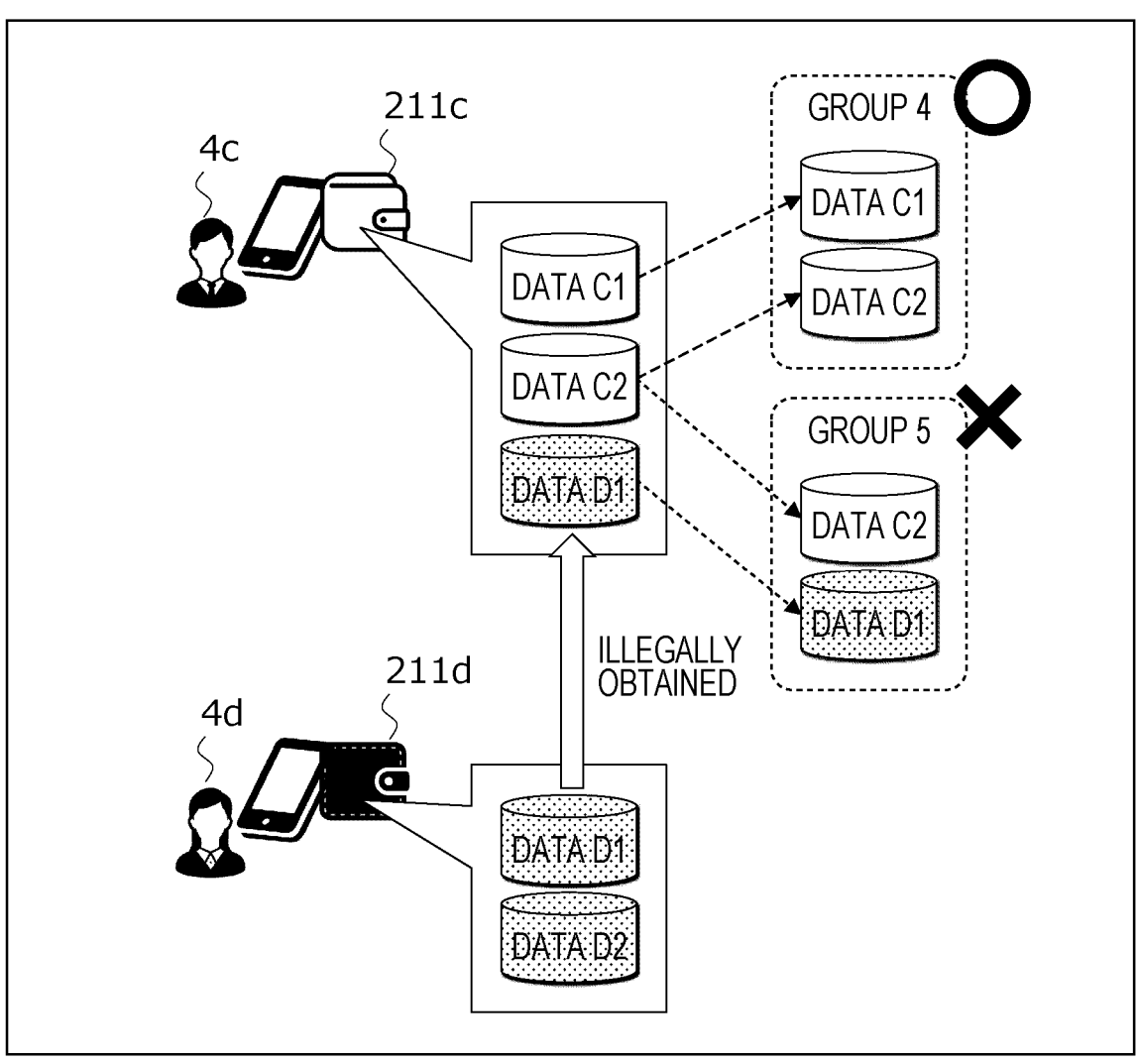
FIG. 4 is a diagram illustrating an outline of another example of the mechanism for providing a personalized service according to an embodiment of the present invention.

FIG. 4 is a diagram illustrating an outline of another example of the mechanism for providing a personalized service according to an embodiment of the present invention. The example in the drawing illustrates a state in which "data C1" and "data C2" are stored in a wallet 211c of a user 4c, and "data D1" and "data D2" are stored in a wallet 211d of a user 4d, and the user 4c has illegally obtained "data D1" from the wallet 211d of the user 4d and has added the "data D1" to its own wallet 211c. Further, the example illustrates a state in which the user 4c provides "data C1" and "data C2" to receive a certain service, and these pieces of data are grouped and a group ID of "group 4" is issued to the group.

Here, if the user 4c provides "data C2" and "data D1" to receive provision of another service, and these pieces of data are grouped and a group ID of "group 5" is issued, and if data of another person is treated as information of the same group like "group 5", the calculation result based on these pieces of data is invalid not based on true information of the user 4c, and the content of the provided service is changed. However, as described above, since the administrator of the data cannot grasp the content of the ciphered data, it is not possible to confirm whether each piece of data provided as data belonging to the same group ("group 5" in the example of FIG. 4) is truly associated with the same user (the user 4c in the example of FIG. 4).

Therefore, in the present embodiment, the data provided by the user is the VC including the ID information, and thus, it is possible to verify that the data is of the user himself/herself, and the service provider (server) side verifies whether all pieces of data provided as data belonging to the same group have the same ID information by the MPC, and then groups the pieces of data when it is confirmed that all the pieces of data have the same ID information. That is, in the example of FIG. 4, "data C2" and "data D1" are not grouped and the group ID of "group 5" is not issued (alternatively, the group ID of "group 5" may be temporarily issued as a "deemed group ID", and then discarded later when it is confirmed that all the pieces of data do not have the same ID information). Thereby, all pieces of data belonging to a certain group can be treated as data of the same user. Note that the service provider side can grasp that pieces of data having the same ID information are data of "the same person", but cannot grasp that "whose" data the pieces of data are.

<Secret Sharing>

FIG. 5 is a diagram illustrating an outline of an example of application of a secret sharing method according to an embodiment of the present invention. The VC 241 as a plaintext before being shared by the secret sharing method (the plaintext has a header portion and a payload portion of JWS concatenated with dots (.) as a character string and decoded in advance in a case of being encoded with Base64URL in the present embodiment, for example) includes data D and Dsig that is a digital signature (a signature portion of JWS that is decoded in advance in the case of being encoded with Base64URL) for the data D. Here, the data D includes a format portion F, ID information SUB_WA, and m pieces of attribute information (claims (pairs of a key and a value) in JSON Web Token (JWT) in the present embodiment, for example) C1 to Cm.

Note that the format portion F is the format portion (in particular, a portion obtained by excluding the value to be protected for privacy according to the present embodiment from the claim set (Claims Set) in the payload portion) in the JSON, and includes not only the payload portion but also the header portion in the JWS. Furthermore, as described above, SUB_WA is a wallet address (WA) of the DID in the present embodiment, but may be an individual number (so-called my number), a passport number, or another identity information as long as the identity information matches the identity information in each VC.

In the present embodiment, the format portion F in the claim set, each of the claims C1 to Cm, and SUB_WA are secret-shared in a separable manner. This is because, when the secret sharing is performed for the VC 241 as the JWS to generate a share, the format portion F of the claim set and the share portion of the data (in the present embodiment, SUB_WA and the value to be protected for privacy of each of claims C1 to Cm) cannot be distinguished from each other on the server side to which the share is distributed, which may interfere with verification and utilization of the data by the MPC on the server side. As a method other than the separation, for example, there is a method of acquiring a share of target privacy information later by assigning, in particular, information indicating from where to where, of a byte sequence of a ciphertext of a claim set, corresponds to the ciphertext of privacy information, and meta information including key information.

Since the format portion F does not include the privacy information of the user 4, it does not need to be concealed. Therefore, the format portion F is distributed to the server participating in the MPC in the plain text as it is without sharing by secret sharing. In this case, if the format portion F is treated as a share and targeted for the MPC when the MPC is performed on the server side for each share 26, the plaintext of the format portion F is included in a plurality of shares, and thus calculation cannot be correctly performed.

Therefore, in the present embodiment, while the format portion F is kept as a plaintext, the format portion F is pseudo-shared by the following method so that the MPC can be correctly performed. Specifically, for example, only one share 26 includes the entire actual content in the format portion F among all the servers, and the format portion F is "zeroed" for the shares 26 of the other servers. The "zeroing" refers to, for example, an operation by a Zero function that converts arbitrary data S into S' in the following manner.

$$S'=Zero(S)$$

$$S=Reconstruct(S,S',S',\ldots,S')$$

That is, "zeroed" S' is data that results in S in a case where decryption (reconstruction) is performed on the basis of shares in which there is only one S and the others are all S', and S' may have any value as long as this requirement is satisfied (that is, S' does not affect decryption (reconstruction). In the additive secret sharing method, S' may be, for example, "0" that is the same size as S.

In a case where the i-th server 3 (party) is represented by $P_i$, in each $P_i$ of $1<i\le n$, $$S'=Zero(S)$$

is performed and S is replaced with S', so that S stored by the first $P_1$ and S' stored by each $P_i$ ($1<i\le n$) satisfy $$Reconstruct(S,S',S',\ldots,S')=S, and$$

S can be obtained by decryption. That is, S and S' (zero value) can be treated as pseudo shares of S.

For example, in the case of data represented by "1234", when the data is "zeroed", the data is replaced with an identity element in Reconstruct function as in:

Zero(1234)=0000. Therefore, when decryption is performed on the basis of the shares stored by all the servers in which only one share is "1234" and the shares stored by all the other servers is "0000", $$1234+0000+0000+\ldots+0000=1234$$

or $$1234@0000@0000@\ldots@0000=1234$$

("@" represents an exclusive OR)
is obtained and the original plaintext "1234" can be obtained.

The method for keeping the format portion F as a plaintext is not limited to "zeroing" described above. For example, a secret sharing method may be performed in which every party except for one party among all the parties (servers 3) that store the shares 26 issues a random number, the random numbers are collected into the one party, and the random numbers issued by the other respective parties are regarded as shares on the one party to which the random numbers are collected. For example, it is possible to reproduce the additive secret sharing by subtracting or performing exclusive OR of all the random numbers from the plaintext to obtain a new share. That is, when the random number issued by each of the parties is $R_i$ ($1<i\le n$), $$S'=S-(R_2+R_3+\ldots+R_n)$$

or $$S'=S@R_2@R_3@\ldots@R_n$$

is set on the party to which the random numbers are collected from the respective parties, $$Reconstruct(S',R_2,R_3,\ldots,R_n)=S$$

is obtained and S can be restored. That is, S' and $R_i$ ($1<i\le n$) can be pseudo shares of S.

In the present embodiment, the above-described "zeroing" is used as the method for keeping the format portion F as a plaintext, and hereinafter, Zero(F) obtained by "zeroing" the format portion F is described as F'. Note that, in the case where the format portion F' is calculated, the format portion F is not used for the MPC, but the format portion F may be held without being separately deleted for the purpose of referring to the key information. In addition, although details will be described below, in a case where a portion to be replaced with the share of the privacy information (the share of the value of the claim included in the share 26) is included in the format portion F, only a portion excluding a marker (for example, a character string to be replaced) for representing the portion to be replaced is zeroed.

Share 26_1, share 26_2, . . . , and share 26_*n* indicate n shares 26 obtained by secret-sharing the VC 241 under the above conditions. For example, the nth share 26_*n* includes the nth share of the VC 241, that is, the nth share D_$n of the data D and the nth share Dsig_$n of the digital signature Dsig. Furthermore, the format portion F of the plaintext (or the format portion F' in the party that has "zeroed" the format portion F) and VC_$n obtained by concatenating the nth share SUB_WA_$n of the ID information SUB_WA and the nth shares C1_$n to Cm_$n of the claims C1 to Cm are included.

Note that the concatenation here refers to an operation of replacing the value (plaintext) of the claim corresponding to the privacy information among the information included in the data D with each share (ciphertext), and is defined as a Replace function. That is, in the i-th server $P_i$ (i∈{1, 2, . . . , n}) to which the secret-shared share 26 is distributed, replacement is performed as follows.

In $P_1$,
VC_$1
= Replace(F, SUB_WA_$i,
C1_$i, ..., Cm_$i)
In $P_i$ ($1 < i \le n$),
VC_$i
= Replace(F', SUB_WA_$i,
C1_$i, ..., Cm_$i)

As described above, each share 26 has a configuration in which the share of each of the claims C1 to Cm can be separated from the format portion F (plaintext). As a result, even if the format portion F included in each share 26 is handled as a share at the time of MPC on the server side, the format portion F' that has been "zeroed" does not affect the result of the Reconstruct function as described above. Therefore, the MPC can be performed on the basis of the content of the share 26 actually including the plaintext of the format portion F, which is only one of all the shares.

Further, even in a case where the format portions F of all the shares 26 include actual content without performing the above "zeroing", for example, verification may be performed by using only the format portion F of the share 26 stored by any one server 3 (P$_i$), and ignoring the format portions F of the other shares 26 and treating the format portions F similarly to "0".

Note that, in addition to leaving the format portion F as a plaintext by the above-described various methods, the format portion F shared by secret sharing may be distributed together.

Furthermore, in the example of FIG. 5, the VC 241 is divided into the data portion and the format portion, and the share 26 is generated by ciphering the other data portion by secret sharing while leaving only the format portion (format portion F) as a plaintext. However, as for the claims C1 to Cm of the data portion, there are the privacy information (secret information that the user himself/herself wants to keep secret) and the non-privacy information (information that the user himself/herself considers OK to open), and the claim corresponding to the non-privacy information may be treated as a plaintext without being ciphered (shared) similarly to the format portion F. In this case, for each claim, information regarding whether the stored data (value) is the privacy information (whether to share the data) may be separately stored, and for example, the plaintext of the data (value) may be kept included in the format portion F.

<System Configuration>

FIG. 1 is a diagram illustrating an outline of a configuration example of a service provision system according to an embodiment of the present invention. A service provision system 1 has, for example, a configuration in which client 2 owned by the user 4 and a plurality of the servers 3 can communicate with each other via a network such as the Internet (not illustrated). The client 2 is a device (first device) having a function to mainly store and manage information of the VC 241 for the user 4, and is implemented by, for example, an information processing terminal such as a personal computer (PC), a tablet terminal, or a smartphone, or another device.

Meanwhile, the server 3 is a device (second device) having a function to separately store each of the plurality of shares 26 generated by secret-sharing the VC 241 in the client 2, perform the MPC on the basis of these shares 26, and obtain the calculation result for providing a personalized service, and is implemented by, for example, a server device, a virtual server built on a cloud computing service, or another device. It is desirable that each of the servers 3 be managed by a different person or business operator who does not collude for the purpose of illegally operating the share 26 and be physically isolated, but a logically isolated configuration such as a plurality of virtual servers constructed on one server device managed by the same person or business operator is not excluded.

Hereinafter, the respective configurations of the client 2 and the server 3 will be described along flows of processing.

[Client]

For example, the client 2 implements above-described various functions of the client 2 by executing middleware such as an operating system (OS) or a database management system (DBMS) expanded on a memory from a recording device such as a hard disk drive (HDD) or a solid state drive (SSD) or software such as a web browser or an application program operating on the middleware by a central processing unit (CPU) (not illustrated). The client 2 includes, for example, units such as a VC processing unit 21, a share provision unit 22, and a group synchronization unit 23 implemented by software. In addition, data stores such as a VC storage unit 24 and an ID storage unit 25 implemented by a database, a file, or the like are included.

The VC processing unit 21 has the above-described function of the DID for enabling the user 4 to handle data issued from the issuer as the VC 241. As described above, the VC 241 obtained via the VC processing unit 21 includes information indicating the identity (ID) (for example, the WA of the DID) and attribute information (for example, "purchased product "apple"", "amount (yen) "100"", and the like). The obtained VC 241 is recorded and stored in the VC storage unit 24. The user 4 may have a function of a user interface for enabling the user 4 to store and manage a set of his/her own VCs 241 in a wallet. In the implementation of the VC processing unit 21, for example, an existing DID product of Microsoft Corporation or the like and a software development kit (SDK) can be appropriately used.

FIGS. 6 and 7 are tables illustrating an outline of a data configuration of the VC storage unit 24 and specific data example according to an embodiment of the present invention. In the present embodiment, for example, in the content of the VC 241 illustrated in the example of FIG. 5, the data D and the digital signature Dsig thereof, the format portion F, and the ID information SUB_WA are stored in the corresponding columns in a table of a VC storage unit 24a of FIG. 6, and the keys and values of the claims C1 to Cm, and the data types of the values (string, number (int, double), boolean, null/empty, object (JSON object), array, and the like are standard, but unique types may be defined) are stored in the corresponding columns in a table of a VC storage unit 24b of FIG. 7. Note that the VC storage unit 24a of FIG. 6 further stores a VCID that uniquely identifies each VC 241 as a key, and the VC storage unit 24b of FIG. 7 further stores a claim ID that uniquely identifies each claim as a key.

In the data D in the VC storage unit 24a of FIG. 6, JWS data is stored as it is. Meanwhile, the drawing illustrates that, in the format portion F, only the value portion of the claim included in the JWS is stored in a state of being replaced with a marker such as "${SUB_WA}" or "${claim ID}". This portion is set to be replaceable with the value by, for example, being represented by a value of the corresponding claim ID in the VC storage unit 24b in FIG. 7 ("C001" in the example of FIGS. 6 and 7) or the character string representing the identity information ("SUB_WA" in the example of FIG. 6). In the present embodiment, the value value of the claim and the portion to be replaced are made distinguishable from each other by being enclosed by "${ }", but any notation method may be used as long as a parser capable of correctly analyzing the notation (for example, JSON grammar) of the data after replacement can be implemented.

Returning to FIG. 1, the share provision unit 22 of the client 2 has a function to cipher the VC specified by the user 4, of the VCs 241 stored in the VC storage unit 24, by the (k, n) threshold secret sharing method, to generate the plurality of shares 26, and provide each share 26 to any of the servers 3. The method of generating the plurality of shares 26 by secret-sharing the VC 241 is as illustrated in the example of FIG. 5, but in this case, since n shares 26 are generated, it is desirable to provide each of the n servers 3 with one share 26. Meanwhile, if k or more of the shares 26 are not provided to one server 3, the original VC 241 is not restored in one server 3. Therefore, a case where the shares are provided to the number of servers 3, the number being less than n (a plurality of the shares 26 is provided to one server 3) is not excluded.

When the data is provided to the server 3 in the form of the share 26, as illustrated in the above-described example of FIG. 3, the group ID (hereinafter may be referred to as a "lending group ID" in the meaning of "the group ID" for the data lent by the client 2 to the server 3") is issued in the server 3 and returned to the client 2 of the user 4. In the present embodiment, as will be described below, information that makes the claim corresponding to a lending claim ID issued for each claim of the VC 241 unique in the server 3 is also returned in addition to the lending group ID, and for example, information such as the key, data type, and value corresponds to the information. In addition, information of a credential for subsequent authentication may also be returned only at the time of first return. In the drawing, these are collectively illustrated as lending information 35.

The group synchronization unit 23 has a function to acquire the lending information 35 returned from the server 3 in cooperation with a group synchronization unit 33 of the server 3 to be described below, record and store the content thereof in the ID storage unit 25, and decrypt (reconstruct) data including the calculation result by the secret sharing method. Thereafter, it becomes possible to receive the calculation result (plaintext) based on the data of the claim associated with the group ID by being synchronized with the calculation result (share) of the MPC based on the share 26 grouped and managed by the group ID in the server 3 by transmitting the lending group ID (and the lending claim ID) returned from the server 3 and the credential information as necessary to the server 3, and by performing decryption (reconstruction) from the share of the acquired calculation result. That is, the act of distributing the share of the calculation result associated with the group ID from the server 3 is a means for distributing the personalized service.

By designating the lending claim ID in addition to the lending group ID, it is also possible to perform processing based on data related to the lending claim ID. For example, it is also possible to exercise a right corresponding to "right of deletion" or "right of correction" defined in EU General Data Protection Regulation (GDPR) on target data.

FIG. 8 is a table illustrating an outline of a data configuration of the ID storage unit 25 and specific data example according to an embodiment of the present invention. The drawing illustrates that the lending group ID and the lending claim ID, and the content of the key and the data type of the target claim are stored as the content of the lending information 35 returned from the server 3. In addition, for each claim, the content of the value decrypted (reconstructed) by the secret sharing method is stored. Note that this table includes not only the data (claims) provided by the VC 241 but also data obtained by decrypting the calculation result of the MPC on the server 3 side based on the data (claims) provided by the VC 241. Similarly, by assigning the claim ID to the calculation result, it becomes possible to perform an operation similar to the data provided by the VC 241. That is, it becomes possible to further use the calculation result for another calculation and processing.

[Server]

Returning to FIG. 1, the server 3 implements the above-described various functions of the server 3 by executing, for example, middleware such as an OS or a DBMS expanded on a memory from a recording device such as an HDD or an SSD or software operating on the middleware by the CPU (not illustrated). The server 3 includes, for example, units such as a share acquisition unit 31, a verification processing unit 32, and a group synchronization unit 33 implemented by software. In addition, a data store such as a share storage unit 34 implemented by a database, a file, or the like is included.

The share acquisition unit 31 has a function to receive and acquire the share 26 provided from the client 2 and temporarily store the share in a recording device such as a memory. The verification processing unit 32 has a function to perform the following three types of verification processing while using the MPC for the share 26 temporarily stored by the share acquisition unit 31, and further includes units such as an issuer verification unit 321, an inclusion verification unit 322, and a grouping unit 323 in order to perform each verification processing. Note that the order of performing the following three types of verification processing is not particularly limited. That is, all the three types of verification processing can be performed in parallel.

The issuer verification unit 321 has a function to verify that the issuer of the target data is a correct issuer as first verification. In this verification processing, the verification algorithm corresponding to a pair with the signature algorithm of the digital signature used for calculating the signature is performed by the MPC. This signature algorithm is determined by the information included in the format portion F. For example, this signature algorithm is determined by the value of the key "alg" in the header portion of the JWS. An algorithm (VerifyMPC function) of integrity verification by the MPC is executed with the public key acquired from the PKI or DPKI based on the value of the key "kid", VC_$i, and the share Dsig_$i of the digital signature included in the VC 241 as input values, and a result is confirmed by decrypting (reconstructing) the share of the verification result.

As second verification, the inclusion verification unit 332 verifies that the share of the privacy information included in VC_$i is a share obtained by secret-sharing the data included in the VC 241. Specifically, for example, taking the share 26_*n* in FIG. 5 as an example, the result is confirmed by performing equivalent verification (EqualMPC function) by the MPC for a value obtained by concatenating the format portion F or F' and the share C1_$n to Cm_$n of each of claims C1 to Cm, that is, VC_$i and the share D_$n of the entire VC 241, and decrypting (reconstructing) the share of the verification result.

Note that the first verification and the second verification can also be performed as one verification. That is, as will be described below, it is possible to perform the first verification and the second verification as one verification by confirming the result by executing the integrity verification algorithm by the MPC using the public key acquired from the PKI or DPKI, the value obtained by concatenating the format portion F or F' and the share C1_$n to Cm_$n of each of the claims C1 to Cm, and the digital signature Dsig_$i included in VC 241 as input values, and decrypting (reconstructing) the share of the verification result.

```
[v] ← VerifyMPC(pk, [Dsig], [VC])
{Accept,Reject}
  ← Reconstruct([v])
```

Note that the value in [ ] schematically represents a secret-shared share. For example, regarding any value X,

```
[X] = {X_$1, X_$2, ..., X_$n}
is obtained. That is,
```

-continued

```
VC = Reconstruct([VC])
    = Reconstruct(VC_$1, VC_$2,
    ..., VC_$n)
``` is obtained. The VerifyMPC function represents the integrity verification algorithm for the digital signature by the MPC. Furthermore, v represents the result of verification by the integrity verification algorithm for the digital signature defined by the value of the key "alg" by pk, Dsig, and VC.

The grouping unit 323 has a function to verify, as third verification, whether the ID information of the VC 241 included in each share 26 is the same as that of another VC 241 and group data related to the VC 241 having the same ID information in a case of acquiring the shares 26 of a plurality of VCs 241.

Specifically, for example, in a case where p different VCs 241 are represented by VC $241_q$ ($q\in\{1, 2, \ldots, p\}$) and these are grouped, and the share of the ID information SUB_WA in the VC $241_1$ is REP_SUB_WA_$i and the share of the ID information SUB_WA in other $(p-1)$ VCs 241 is $sub_q$_$i, the equivalent verification (EqualMPC function) by MPC is performed for REP_SUB_WA_$i and $sub_q$_$i in $1<q\leq p$.

```
[e_q] ← EqualMPC([REP_SUB_WA],
[sub_q])
{Accept,Reject}
    ← Reconstruct([e_q])
```

Note that $e_q$ represents the result of equivalent verification of SUB_WA and REP_SUB_WA included in the q-th VC 241 in the range of $1<q\leq p$. In addition, the EqualMPC function represents the equivalent verification by MPC. If the pieces of ID information of all the VCs 241 have the same value (if all Reconstructs ([$e_q$]) return Accept in $1<q\leq p$), it is determined that the grouping has succeeded.

In a case where Accept is returned in all the verifications in the processing of the issuer verification unit 321, the processing of the inclusion verification unit 322, and the processing of the grouping unit 323, the group ID is issued to the VC 241. In particular, in the equivalent verification of the grouping unit 323, in a case where there is any VC 241 whose ID information is not the same value, only the VCs 241 whose ID information is the same value may be grouped, or the one VC 241 may be discarded and predetermined exception processing may be performed. In the case where the VCs 241 are grouped, the claim ID is further assigned to each value included in each VC 241. The assigned group ID and claim ID are returned to the client 2 as the lending group ID and the lending claim ID (with a property name of the VC 241) respectively by the group synchronization unit 33 to be described below.

The information related to the grouped VCs 241 is stored in the share storage unit 34. FIGS. 9 and 10 are tables illustrating an outline of a data configuration of the share storage unit 34 and specific data example according to an embodiment of the present invention. In the present embodiment, for example, the table of a share storage unit 34a illustrated in the example of FIG. 9 indicates that the share of the lending group ID and the ID information SUB_WA is stored as the information related to the group ID. In the drawing, a state in which the value of the ID information SUB_WA of the record whose lending group ID is "group 1"

is represented by "30181B . . . " as a hexadecimal random number indicates a shared (ciphered) state.

In addition, the table of a share storage unit 34b illustrated in the example of FIG. 10 indicates that information of the share of the value is stored as the information regarding the claim ID, in addition to the lending group ID and the lending claim ID, and the plaintext of the key and data type in the claims other than the signature. In the drawing, a state in which the value of the value of the record whose key of the claim is "name" is represented by a hexadecimal random number indicates a shared (ciphered) state. Furthermore, the drawing illustrates that the claim is the non-privacy information, and information of a flag for determining whether the claim is left as a plaintext without being shared by secret sharing is also stored. Note that, as described above, for the claim left as a plaintext, only one server 3 stores the content of the plaintext in the value, and the value of the claim is "zeroed" in the other servers 3.

The group synchronization unit 33 cooperates with the group synchronization unit 23 of the client 2, and has a function to return, to the client 2, the issued lending group ID, the lending claim ID, and the information of the corresponding claims (key, value, data type, and the like) as the lending information 35 for the VCs 241 grouped by the grouping unit 323. Note that only at the time of first return to the client 2, the lending information 35 may further include the information of a credential for subsequent authentication.

Although the lending information 35 returned to the client 2 of the user 4 does not include the privacy information of the user 4 itself, for example, in a case where an IP address of the client 2 at the return destination is the same every time, there may be a risk that the user 4 is identified from the IP address. Therefore, for communication between the server 3 and the client 2, for example, it is desirable to use a communication means capable of concealing a connection path such as Tor.

<Flow of Processing>

Figure 11:
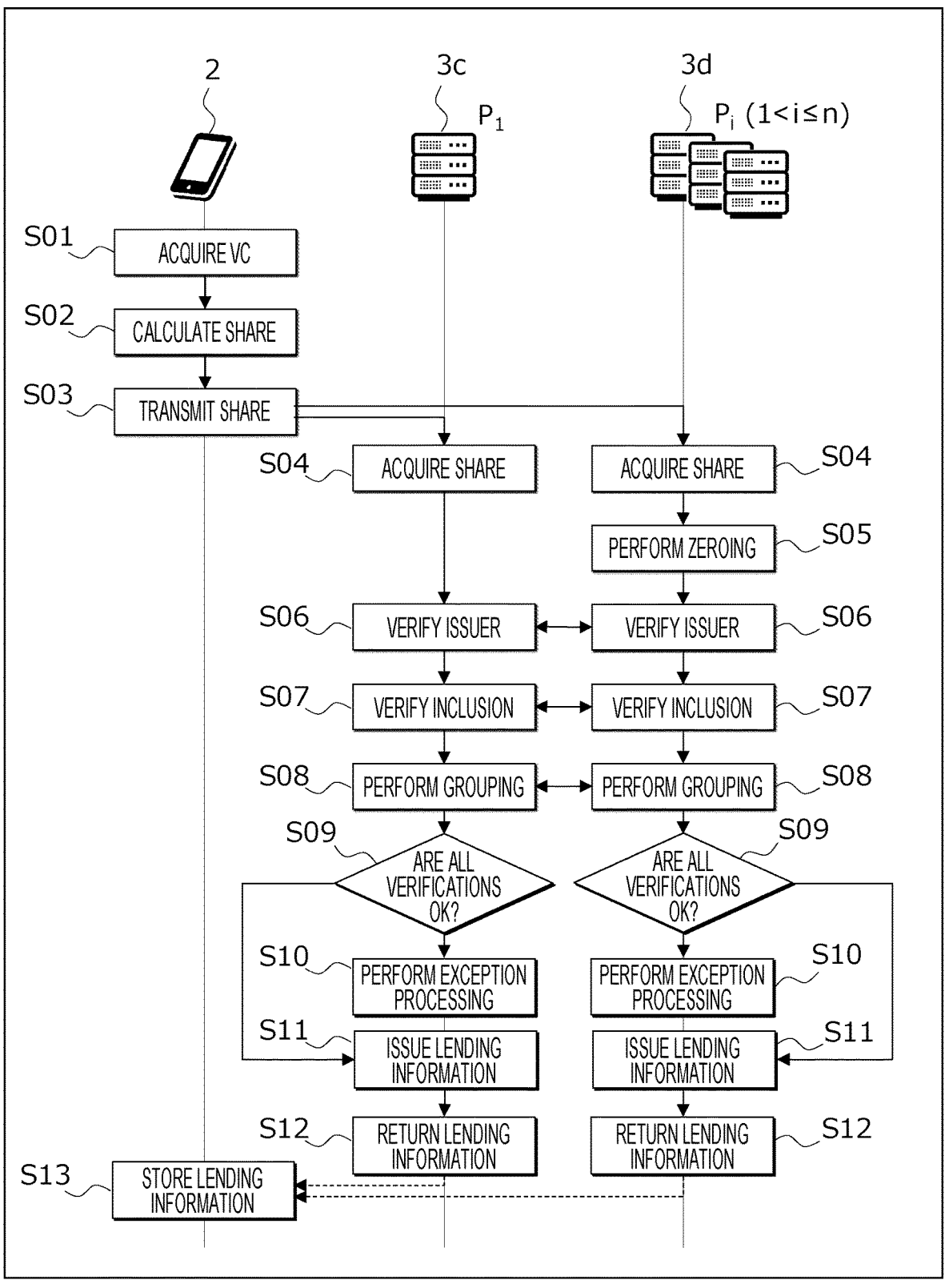
FIG. 11 is a flowchart illustrating an outline of an example of a flow of processing from distribution of each share from a client to a server to verification in the server in an embodiment of the present invention.

FIG. 11 is a flowchart illustrating an outline of an example of a flow of processing from distribution of each share 26 from the client 2 to the server 3 to verification in the server 3 in an embodiment of the present invention. First, in the client 2, the VC processing unit 21 acquires the VC 241 from the data issued by the issuer to the user 4, and stores the VC in the VC storage unit 24 (S01). Thereafter, the share provision unit 22 calculates n shares 26 (share 26_$i$ ($1\leq i\leq n$)) from the VC 241 stored in the VC storage unit 24 (S02), and transmits the n shares 26 to a total of n servers 3 (in the illustrated example, the first server 3c ($P_1$) and the i-th ($1<i\leq n$) server 3d ($P_i$)), respectively (S03). Note that, in the illustrated example, the shares are distributed to the n servers 3 (the server 3c and the server 3d), but as described above, the number may be less than n as long as the number of servers 3 is larger than the threshold k of secret sharing at the time of calculating the shares 26.

In each of the servers 3 (the server 3c and the server 3d) to which the shares 26_$i$ ($1\leq i\leq n$) have been transmitted, the share acquisition unit 31 acquires and temporarily stores the share (S04). Thereafter, in the other servers 3 (that is, the server $3d$ ($P_i$ ($1<i\leq n$)) except the server 3 (the server 3c ($P_1$)) that stores the plaintext when the format portion F is pseudo-shared by the above-described method, the format portion F is "zeroed" by the above-described method (S05).

Thereafter, the verification processing unit 32 performs the MPC between the servers 3 (the server 3c and the server $3d$) to perform the three types of verification processing of the following steps S06 to S08. Note that, as described above, the order of performing the three types of verification processing is not particularly limited, and the order illustrated in FIG. 11 is an example. In addition, the verification processing in steps S06 and S07 can also be performed by one verification processing.

As the first verification, the issuer verification unit 321 verifies that, by the MPC, the issuer of the data of the original VC 241 is a correct issuer (S06). Specifically, the public key is acquired in advance from the PKI or DPKI on the basis of the value of the key "kid" in the header portion of the JWS in the format portion F, the signature verification algorithm is further specified from the value of the key "alg", and this algorithm is agreed among the servers 3 ($P_1$ to $P_n$). Then, the integrity of the signature is verified on the basis of VC_\$i and Dsig_\$i included in each share 26_*i*, and the result is confirmed by decrypting (reconstructing) the share of the verification result.

As the second verification, the inclusion verification unit 322 verifies that, by the MPC, the share of the privacy information included in VC_\$i is a share obtained by secret-sharing the data included in the original VC 241 (S07). Specifically, for example, as described above, the result is confirmed by performing equivalent verification for VC_\$i and D_\$i included in each share 26_*i* by the MPC, and decrypting (reconstructing) the share of the verification result.

As the third verification, the grouping unit 323 groups the VCs 241 with the same ID information included in each share 26_*i* (S08). Specifically, for example, the equivalent verification is performed for the share of the ID information SUB_WA in the VC 241 related to the share 26_*i* and the share of the ID information SUB_WA in another VC 241, and if all the shares have the same value, it is determined that the grouping has succeeded, and the group ID is issued to these VCs 241. In a case where there is any VC 241 not having the same value, only the VCs 241 having the same value may be grouped. In the case where the group ID is issued, the claim ID is further assigned to each value included in the VC 241 related to the share 26_*i*.

Thereafter, whether there is no problem in all the results of the above-described three types of verification processing (all the verification results are true (Accept)) is determined (S09), and in a case where there is any problem (there is at least one false (Reject) in the verification result), predetermined exception processing is performed (S10). On the other hand, in a case where there is no problem in all the verification results in step S09, the group synchronization unit 33 stores the issued group ID, claim ID, and corresponding claims (key, shared value, data type, and the like) in the share storage unit 34, and returns them to the client 2 as the lending information 35 (S11) (S12). In the client 2 that has received the return of the lending information 35, the group synchronization unit 23 acquires the information and records the information in the ID storage unit 25 (S13).

In particular, in a case where it is desired to avoid occurrence of a waiting time for the user 4 due to the processing time in steps S06 to S08, the share acquisition unit 31 or the group synchronization unit 33 may issue a "deemed group ID" on the assumption that the pieces of ID information of all the VCs 241 have the same value immediately after step S04, and (issue a credential as needed, and along with the credential), return the "deemed group ID" to the group synchronization unit 23 of the client 2. In this case, when all the verifications in steps S06 to S08 are successful, the "deemed group ID", the lending claim ID, and the corresponding claims (key, shared value, data type, and the like) are stored in the share storage unit 34.

Note that, regardless of the input value and the output value of calculation, the servers participating in the MPC may communicate with each other so as not to cause inconsistency between the lending group ID and the lending claim ID allocated to the data, and agree the equivalence of the lending group ID and the lending claim ID issued for the same data or a numbering method. Alternatively, the lending group ID and the lending claim ID may be assigned different numbers for each server 3. In this case, for example, in the client 2, the lending group ID and the lending claim ID illustrated in FIG. 8 are stored for each server 3, and an ID for making a set of shares to be used for restoration (reconstruct) of each data (claim value) unique is additionally assigned.

Figure 12:
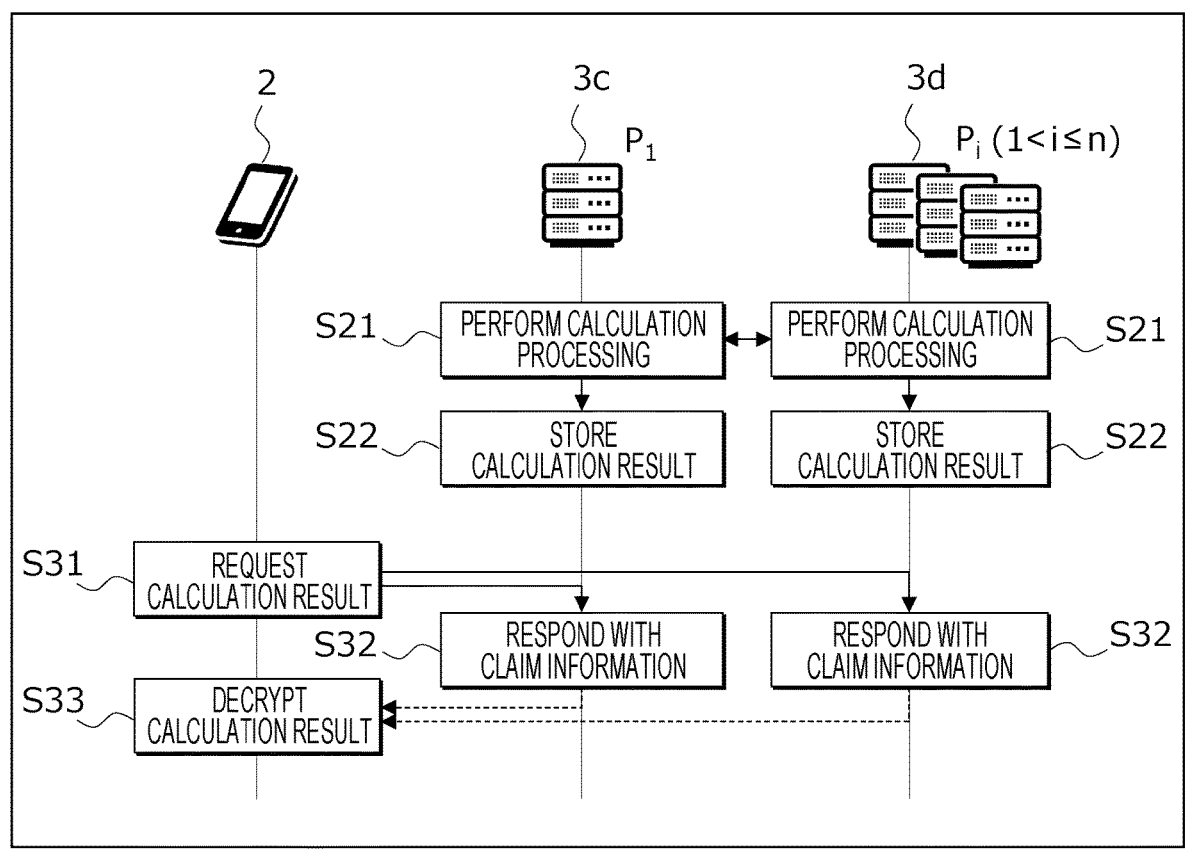
FIG. 12 is a flowchart illustrating an outline of an example of a flow of processing after verification of shares is performed in a server until a personalized service is provided in an embodiment of the present invention.

FIG. 12 is a flowchart illustrating an outline of an example of a flow of processing after verification of shares 26 is performed in the server 3 until a personalized service is provided in an embodiment of the present invention. In each server 3 ($P_i$ ($1 \le i \le n$)), the group synchronization unit 33 performs calculation processing by the MPC on the basis of the claim information associated with the lending group ID stored in the share storage unit 34 (S21). Thereafter, the lending claim ID is issued to the output result (share) of the calculation, the same lending group ID as the claim used as the input value of the calculation is associated with the calculation result, and the calculation result is recorded in the share storage unit 34 as claim information (S22). The claim information includes the issued lending claim ID, key information indicating meaning of the calculation result, the share of the calculation result (the share of the value), the data type of the calculation result, and the like.

Note that, as for the calculation processing in step S21, processing efficiency may be improved by internally converting the secret sharing method into a different calculation method in the server 3, then performing an analysis, and performing the secret sharing for the result again, as will be described below, for example, in consideration of load, efficiency, and the like of the calculation processing by the MPC.

The client 2 requests the calculation result by transmitting information of the lending group ID corresponding to the VC 241 provided to receive the personalized service to each server 3 ($P_i$ ($1 \le i \le n$)) (S31). Each server 3 ($P_i$ ($1 \le i \le n$)) extracts, from the share storage unit 34, the claim information grouped with the lending group ID (including the above-described calculation result in step S21), and responds to the client 2 with the extracted information (S32). The client 2 performs decryption (reconstruct) by the secret sharing method on the basis of the share of the value in the claim information responded from each server 3 ($P_i$ ($1 \le i \le n$)), thereby acquiring the calculation result based on the claim data associated with the lending group ID (S33). That is, it is possible to receive the distribution of the personalized service.

<Utility Form>

In the configuration as described above, for example, a case where the service provider desires to provide "an advertisement of alcohol for users aged 20 and over, and an advertisement of juice for users aged less than 20" is assumed as a use case. In a state where the user 4 has provided age information as the VC 241 and the group ID for the age information has been issued in the server 3, the server 3 side executes, for the group including data of "age", processing (MPC) such as if (age>=20)

"advertisement of beer"

else

"advertisement of orange juice". The group ID of the group to which the calculation has been applied is associated with the calculation result.

The server 3 side cannot grasp the content of the calculation result ("advertisement of beer" or "advertisement of orange juice") because the calculation result remains in the form of share, whereas the client 2 of the user 4 can receive personalized advertisement related to the calculation result by performing decryption by reconstruct of the secret sharing method on the basis of the calculation result returned from each server 3. At this time, since the server 3 side performs the processing by the MPC via the group ID, the server 3 side not only cannot know the content of the calculation result but also cannot specify the user 4 who has provided the VC 241. As a result, it becomes possible to provide the personalized service unique to the user 4 while firmly protecting the privacy information.

Note that the MPC processing between the servers 3 has a large calculation processing load and communication overhead, and it is difficult to say that the processing efficiency is high. Therefore, for example, the processing efficiency may be improved by internally converting the secret sharing method into a different calculation method on the server 3 side. For example, the share 26 of the VC 241 acquired by each server 3 may be converted into a so-called homomorphic encryption by the MPC and then calculated, the obtained calculation result may be secret-shared again, and the share of the decrypted result of the homomorphic encryption by the MPC may be obtained from the share (the processing performance may be improved depending on an environment and conditions). Further, the share 26 acquired by each server 3 may be calculated after being decrypted (reconstructed) in a trusted application (TA) that operates on a hardware-based TEE, and the calculation result may be secret-shared again to generate and output the share. Note that, in the latter case, in particular, the safety for privacy protection may be reduced.

Although the invention made by the present inventors has been specifically described on the basis of the embodiment, the present invention is not limited to the above embodiment, and it goes without saying that various modifications can be made without departing from the gist of the present invention. The above embodiment has been described in detail in order to explain the present invention in an easy-to-understand manner, and the present invention is not necessarily limited to one including all the configurations described. Another configuration can be added to, deleted from, and replaced with part of the configuration of the above-described embodiment.

Part or all of the above-described configurations, functions, processing units, processing means, and the like, may be implemented by hardware by being designed as an integrated circuit, or the like. Alternatively, the above configurations, functions, and the like, may be implemented by software by a processor interpreting and executing a program that implements each function. Information such as programs, tables, and files for implementing each function can be stored in a recording device such as a memory, a hard disk, and a SSD, or in a recording medium such as an IC card, an SD card, and a DVD.

The above drawings illustrate control lines and information lines that are considered necessary for the description and do not necessarily illustrate all the implemented control lines and information lines. In reality, almost all the configurations may be considered mutually connected.

INDUSTRIAL APPLICABILITY

The present invention can be used in a service provision system that provides a personalized service without identifying the user himself/herself.

REFERENCE SIGNS LIST

1 Service provision system
2 Client
3 Server
3*a* Server A
3*b* Server B
3*c*, 3*d* Server
4, 4*a* to 4*c* User
5 DPKI
6 Data collection facility
7 Administrator
21 VC processing unit
22 Share provision unit
23 Group synchronization unit
24, 24*a*, 24*b* VC storage unit
25 ID storage unit
26, 26_1 to 26_*n* Share
31 Share acquisition unit
32 Verification processing unit
33 Verification processing unit
34, 34*a*, 34*b* Share storage unit
35 Lending information
211*a* to 211*d* Wallet
241 VC
321 Issuer verification unit
322 Inclusion verification unit
323 Grouping unit

The invention claimed is:

1. A service provision system comprising:
a plurality of first devices of a plurality of users, each of the plurality of first devices providing verifiable credentials (VCs) verifiable as being of each one of the plurality of users; and
a plurality of second devices configured to provide a service to each one of the plurality of first devices via a network using multi-party computation (MPC) as a secret calculation in which each one VC of the VCs is divided into a plurality of shares by a secret sharing method and each of the plurality of shares is arranged in the plurality of second devices, the plurality of second devices being in an isolated state, wherein each one of the plurality of second devices perform calculation while maintaining secrecy of the VCs while performing communication with others of the plurality of second devices via the network to obtain a calculation result,
wherein at least one of the plurality of first devices comprises:
a VC storage unit that stores VC of a respective user;
a share provision unit configured to acquire the VC from the VC storage unit, divides the VC into the plurality of shares by the secret sharing method, and distributes each of the plurality of shares to the plurality of second devices, wherein the VC includes privacy information to be calculated and identity (ID) information for identifying the respective user, each one of the plurality of shares includes a share of the privacy information and a share of the ID information,
wherein at least one of the plurality of second devices comprises:

a share acquisition unit configured to acquire one share of the plurality of shares of the VC distributed from the at least one of the plurality of first devices;

a verification processing unit configured to verify, by performing the MPC between the plurality of second devices, whether the share of the ID information of the VC acquired by the share acquisition unit matches a share of the ID information in at least one other VC of the plurality of VCs, and group a plurality of shares of the privacy information in VCs having shares of the ID information matching the share of the ID information of the VC acquired by the share acquisition unit and issues a group ID;

a share storage unit that stores the group ID and information related to the share of the ID information; and a first group synchronization unit configured to return information including the group ID to the at least one of the plurality of first devices, wherein the at least one of the plurality of first devices further comprises:

a second group synchronization unit configured to acquire information of the group ID related to the VC returned from the at least one of the plurality of second device; and an ID storage unit that stores the information of the group ID, wherein the second group synchronization unit of the at least one of the plurality of first devices is further configured to decrypt a predetermined secret calculation result of the privacy information related to the service from the at least one of the plurality of second devices by the secret sharing method on a basis of the group ID and acquire decrypted predetermined secret calculation result, and wherein the share provision unit of the at least one of the plurality of first devices separates the privacy information and non-privacy information in the VC, divides the non-privacy information into a plurality of shares in a state of being in a plaintext by the secret sharing method, concatenates one of the plurality of shares with the non-privacy information, and concatenates each share other than the one of the plurality of shares with plaintext, the plaintext is the same size as the non-privacy information in the state of being in the plaintext and does not affect decryption of the VC by the secret sharing method.

2. The service provision system according to claim 1, wherein the non-privacy information includes format information in the VC, and the verification processing unit of the at least one of the second devices verifies that, for at least one of the plurality of shares of the VC distributed from the at least one of the plurality of first devices, the privacy information included in the at least one share is data related to an element defined in the format information.

3. The service provision system according to claim 1, wherein at least one VC of the VCs satisfies all of the following conditions:

(1) there is an issuer responsible for issuing the at least one VC, and a digital signature is added as a means for proving that the at least one VC is issued by the issuer;

(2) the VC includes the ID information for identifying the respective user;

(3) the at least one VC issued is structured data or a set of the structured data, and the at least one VC is restorable when meta information assigned to each element is given even if a format and elements are separated;

(4) a storage location of the ID information is uniquely determined in structured data;

(5) the at least one VC includes information that uniquely determines a digital signature algorithm and a public key acquisition method; and (6) the digital signature has been performed for the structured data or entire set of the structured data at a time.

4. The service provision system according to claim 1, wherein the ID information is a wallet address in a blockchain.

5. The service provision system according to claim 1, wherein a communication between the at least one of the plurality of first devices and each one of the plurality of second devices uses a communication means capable of concealing a connection path.

* * * * *